United States Patent
Carson

[11] 3,918,676
[45] Nov. 11, 1975

[54] FLUSH VALVE
[76] Inventor: Earl W. Carson, 287 Hazard Ave., Enfield, Conn. 06082
[22] Filed: July 11, 1974
[21] Appl. No.: 487,711

[52] U.S. Cl. .............................. 251/51; 222/477
[51] Int. Cl.². E03D 3/04; F16K 21/06; F16K 31/12
[58] Field of Search .......... 137/513.5, 525; 222/17, 222/477; 251/15, 19, 21, 22, 23, 48, 52, 54, 55, 51

[56] References Cited
UNITED STATES PATENTS

| | | | |
|---|---|---|---|
| 685,929 | 11/1901 | Nethery | 251/20 |
| 710,959 | 10/1902 | Engelhard | 251/52 |
| 1,327,000 | 1/1920 | Watrous | 251/51 |
| 1,961,469 | 6/1934 | West et al. | 251/51 |
| 2,549,909 | 4/1951 | Joynes | 251/15 |
| 2,931,615 | 4/1960 | Campbell | 251/54 |
| 3,197,172 | 7/1965 | Brandenberg et al. | 251/23 |
| 3,451,422 | 6/1969 | Chorkey | 137/525 |
| 3,632,043 | 1/1972 | Kirschmann et al. | 137/525 |

*Primary Examiner*—Martin P. Schwadron
*Assistant Examiner*—George L. Walton

[57] ABSTRACT

A flush valve is presented which may be manually actuated and is self-closing. The valve has a spool valve element, one end of which controls communication between a fluid inlet and a fluid outlet, and the other end of which defines a control chamber. A passageway through the spool communicates with the control chamber via a flexible valve in the form of a resilient rubber sleeve which controls the rate of closing of the valve.

4 Claims, 3 Drawing Figures

FLUSH VALVE

BACKGROUND OF THE INVENTION

This invention relates to the field of fluid flow control valves. More particularly, this invention relates to the field of valves which close automatically after the delivery of a predetermined volume of liquid.

While not limited thereto in its utility, the present invention is particularly suitable and will be described in terms of a flush valve for water closets. However, it will be noted and understood that the valve of the present invention is suitable for a wide range of applications in which there is a need for a valve which automatically closes after being actuated to supply a predetermined amount of liquid from a reservoir to a discharge passage.

The standard water closet flush valve in use in the United States at the present time has remained essentially unchanged for many years. This standard prior art flush valve involves a cumbersome linkage arrangement, is noisy and is susceptible to leakage. The valve of the present invention eliminates or reduces these disadvantages of the prior art, and presents a flush valve of simple reliable construction.

SUMMARY OF THE INVENTION

The flush valve of the present invention is manually actuated and self-closing. The valve is constructed in the form of a spool valve with enlarged ends serving as pistons housed in separate chambers. One of the pistons controls communication between the inlet and the outlet, and movement of the spool results in communication between the inlet and the outlet to provide the necessary water for flushing. The inlet water also passes through a central passageway in the spool through an orifice at the end of the spool on an extension which projects into a control chamber defined by the other piston. A resilient rubber sleeve surrounds the projection, and the sleeve flexes under the pressure of water in the central passageway to permit water to flow out of the orifice and into the control chamber. As the water fills the chamber, the pressure on the sleeve equalizes and the sleeve then closes to terminate flow into the control chamber. A force differential moves the spool to reclose the valve, and in so doing encounters the resistance of the fluid in the control chamber. A bleed hole is provided through the rubber sleeve communicating with the orifice and central passageway to permit bleeding of the fluid from the control chamber at a controlled rate so as to permit a controlled closing of the valve.

The spool valve element of the valve of the present invention is directly actuated by an actuation handle which is in the form of a manually operated plunger which extends from the spool valve element. The one piece spool valve and the manually actuated plunger is the only moving element in the valve (other than the rubber sleeve which flexes), and this movable element moves only in a straight line. Accordingly, the rather elaborate and lengthy linkage mechanisms of present standard flush valves are eliminated. Furthermore, the positive closing action on the spool valve and the sealing capabilities of the spool valve minimize the problem of leakage.

Accordingly, one object of the present invention is to provide a novel and improved automatically closing valve.

Another object of the present invention is to provide a novel and improved flush valve, particularly for use with water closets.

Another object of the present invention is to provide a novel and improved flush valve which incorporates a spool valve mechanism as the operating valve mechanism.

Still another object of the present invention is to provide a novel and improved automatically closing valve in which the closing of the valve is controlled by the cooperative action of a flexible sleeve and a chamber defined by part of the valve.

Other objects and advantages of the present invention will be apparent to and understood by those skilled in the art from the following detailed description and drawings.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
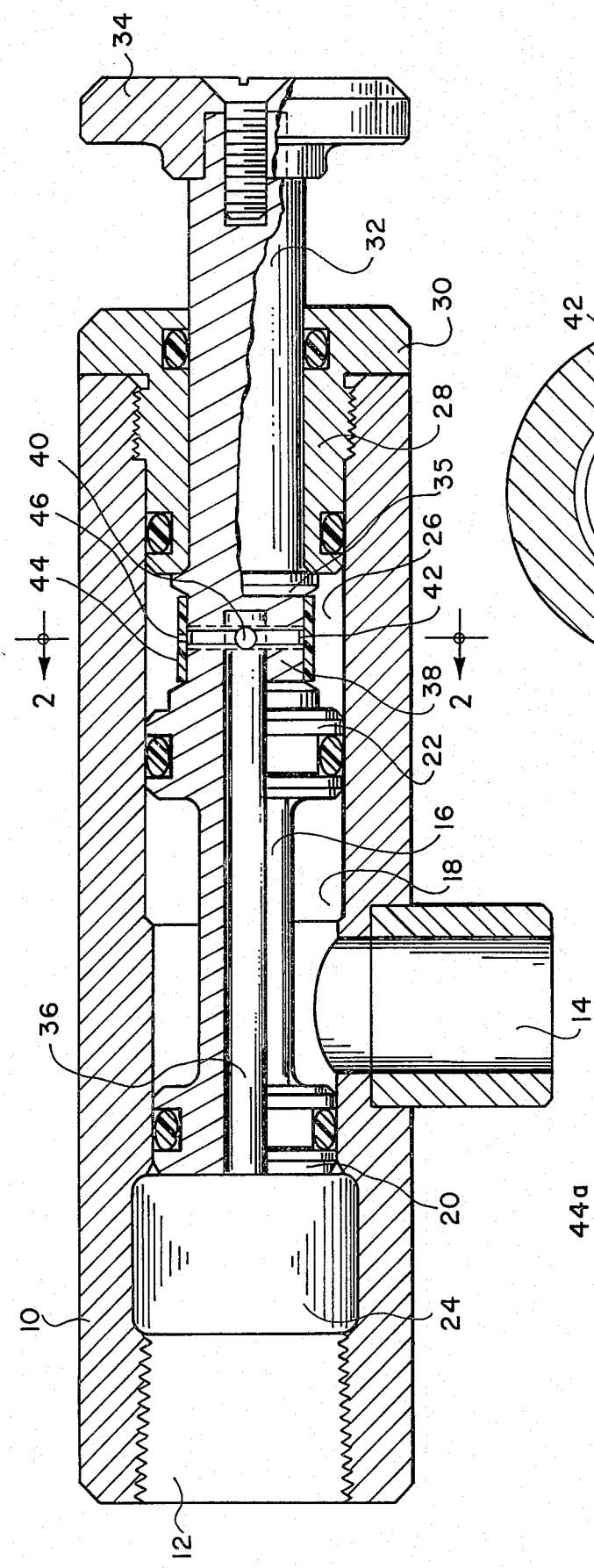
FIG. 1 is a cross-sectional elevation view of the valve of the present invention.

Referring now to FIG. 1, the flush valve of the present invention is shown in a side elevation view. The valve has a body 10 which has an inlet 12 and an outlet 14 for the passage of water or other fluid. A spool valve element 16 is housed in the hollow interior 18 of the valve body. The spool valve has a primary piston 20 at the left end thereof and a secondary piston 22 at the right end thereof. A supply chamber 24 is positioned adjacent inlet 12 and abuts the left end of piston 20 in the position shown in FIG. 1. A control chamber 26 is defined between secondary piston 22 and a boss 28 which extends into the hollow interior of the valve from an end closure 30, the boss 28 being threadably engaged to the interior of the valve housing. An integral slidable plunger 32 extends from spool valve element 16 and is mounted for sliding movement in boss 28. A handle 34 is mounted on part of plunger 32 projecting beyond the valve housing for manual actuation of the flush valve.

Figure 2:
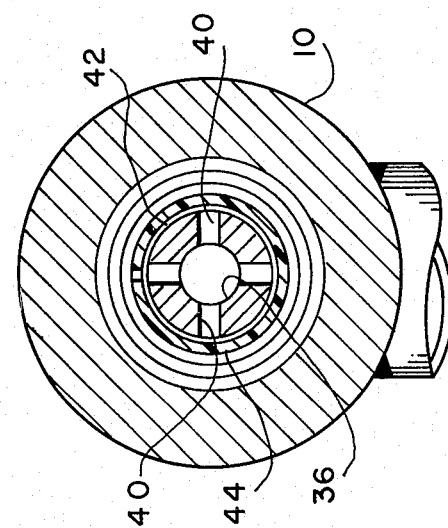
FIG. 2 is a view taken along line 2—2 of FIG. 1.

A central passageway 36 extends through spool valve 16. The left end of passageway 36 communicates with supply chamber 24. On the right end of the spool valve, central passageway 36 extends into a spool extension 38 which projects into control chamber 26. One or more flow orifices (see also FIG. 2) extend radially outwardly from the central of extension 38, the flow orifices communicating with central passageway 36. The flow orifices 40 terminate in an annular groove 42 at the outer surface of extension 38. A resilient annular rubber sleeve 44 is mounted on the outer surface of extension 38, and sleeve 44 has a bleed orifice 46 whereby orifices 40 in groove 42 can communicate with control chamber 26.

In the position shown in FIG. 1, the valve is in the closed position whereby inlet 12 is sealed from outlet 14 by primary piston 20. In this closed position of the valve resilient rubber sleeve 44 is in a contracted state and firmly engages the outer surface of extension 38. Supply fluid is present at inlet 12 and in supply chamber 24, and that supply fluid fills central passageway 36 and also occupies control chamber 26 whereby the pressure of the fluid in chamber 26 bears against the outer surface of sleeve 44 to urge sleeve 44 against extension 38. O-rings or other sealing elements, as shown, are employed to prevent leakage past pistons 20 and 22, boss 28 and sliding plunger 32.

A force unbalance on spool valve 16 keeps it in the position shown in FIG. 1. This force unbalance results from an area differential because plunger 32 is integral with extension 38. Thus, the liquid acts on a larger area at the left side of piston 20 than on the right side of piston 22, whereby a net rightward force is generated.

When it is desired to actuate the flush valve, handle 34 is depressed, whereby sliding plunger 32 is moved to the left. Since plunger 32 is in integral with projection 38, the leftward movement of plunger 32 drives spool valves 16 to the left. On the leftward movement of spool valve element 16, primary piston 20 moves entirely into chamber 24, whereby fluid communication is established between supply chamber 24 and outlet 14. Fluid thus flows from inlet 12 through supply chamber 24 and thence to the hollow interior 18 of the valve housing and then to outlet 14. The flushing or other supply action to be effected by the delivery of the fluid is thus accomplished.

The leftward movement of spool valve element 16 upon depression of handle 34 also results in a leftward movement of secondary piston 22 whereby the volume of control chamber 26 is substantially enlarged. This enlargement of control chamber 26 results in a substantial reduction in the pressure in chamber 26. At the same time, the fluid is forced through central passage 36 from chamber 24 to be delivered to annular groove 42. The pressure of the fluid in annular groove 42 acting on the inside of sleeve 44 is greater than the pressure on the outside of sleeve 44 at this stage of operation, and hence sleeve 44 flexes, i.e. is expanded relative to the outer surface of extension 38, and fluid under pressure flows into chamber 26 via central passageway 36, orifices 40, and annular groove 42. The fluid flows into control chamber 26 to fill the chamber, while spool valve element is moving to the left, and the fluid pressures across sleeve 44 equalize when the leftward movement of the spool valve element is terminated, whereby the sleeve returns to its original unflexed state to in essence close off flow through orifices 40. Upon removal of the leftward actuating force, the rightward load on the spool valve, which is the result of area differentials as discussed above, moves the spool valve to the right and encounters the resistance of the fluid in control chamber 26. The continued rightward force on spool valve 16 results in the fluid in chamber 26 being bled through bleed orifice 46 back into groove 42 and orifices 40 to central passage 36. The rate of this liquid bleed is controlled by the size of bleed orifice 46, and hence the fluid in control chamber 26 will be bled through bleed orifice 46 until the valve is moved to the right to reassume the original position shown in FIG. 1. There is thus established a controlled rate of bleeding of the liquid from chamber 26 so as to permit a controlled closing of the valve. When spool valve element 16 returns to the FIG. 1 position, fluid communication is again blocked off between inlet 12 and outlet 14, and the valve is ready for another cycle of operation.

Figure 3:
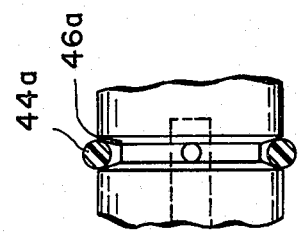
FIG. 3 is a showing of a modification of a detail of the valve.

Referring to FIG. 3, a modification of the flexible sleeve is shown. In this configuration, sleeve 44 is replaced with a flexible O-ring 44a which is slightly stretched so as to be preloaded to seat against inclined sides of groove 42. When the valve is actuated, fluid pressure in passage 36, orifice 40 and groove 42 will expand O-ring 44a to permit the fluid to pass into control chamber 26 (just as sleeve 44 expands in the FIG. 1 embodiment). O-ring 44a will return to its normal preloaded position when the fluid pressure across it equalizes. A groove 46a, shown in the side wall of groove 42 (but which also may be formed in O-ring 44a) connects chamber 26 with the bottom of groove 42 for the controlled bleeding function which is performed by groove 46 in FIG. 1. The embodiment of FIG. 3 functions just like the FIG. 1 embodiment, with O-ring 44a and groove 46a taking the place of and performing the functions of sleeve 44 and bleed orifice 46.

It is to be noted that in either the FIG. 1 or FIG. 3 embodiment the bleed orifice (46 or 46a) can be in the valve body directly connecting chamber 26 to central passageway 36.

From the foregoing description, it can be seen that the valve of this invention is manually operated and then is self-closing, at a controlled rate. Furthermore, the valve element and the actuating element move only in a linear direction along the same axis.

While a preferred embodiment has been shown and described, various modifications and substitutions can be made thereto without departing from the spirit and scope of the invention. Accordingly, it is to be understood that the present invention has been described by way of illustration and not limitation.

What is claimed is:

1. A fluid valve including:
   a valve body having a fluid inlet and a fluid outlet;
   valve means in said valve body, said valve means being movable between a first position in which said fluid inlet is sealed from said fluid outlet and a second position in which said fluid inlet is in fluid communication with said fluid outlet;
   a pair of spaced apart piston means on said valve means, said piston means having differential area whereby a fluid pressure generated force on said piston means urges said valve means toward said first position;
   control chamber means in said valve body for containing fluid to control the rate of movement of said valve means from said second position to said first position, said control chamber being defined in part by said valve means;
   projection means extending from said valve means into said control chamber means, said projection means cooperating with one of said piston means to establish the differential area of the piston means;
   passage means in said valve means for delivering fluid from said inlet to said control chamber, said passage means including orifice means in said projection means;
   resilient sleeve means on said valve means for controlling fluid flow from said passage means into said control chamber means, said resilient sleeve means being exposed on one side thereof to fluid pressure in said passage means and said sleeve means being exposed on the other side thereof to pressure in said control chamber;
   bleed means through said resilient sleeve means to provide fluid communication between said control chamber means and said passage means and to bleed fluid from said control chamber means to said passage means; and actuator means for actuating said valve means from said first position to said second position.

2. A fluid valve as in claim 1 including:

an annular groove in said projection means, said projection orifice means and said bleed orifice means communicating with said annular groove.

3. A fluid valve including:

a valve body having a fluid inlet and a fluid outlet;

spool valve means in said valve body, said spool valve means having first and second pistons and being movable between a first position in which said first piston seals said fluid outlet from said fluid inlet and a second position in which said fluid outlet and fluid inlet are in fluid communication, said pistons having differential area whereby a fluid pressure generated force on said spool valve means urges said spool valve means toward said first position;

control chamber means in said valve body for containing fluid to control the rate of movement of said spool valve means from said second position to said first position, said control chamber being defined in part by said second pistons;

projection means extending from said second piston into said control chamber means, said projection means cooperating with said second piston to establish the differential area of the piston means;

passage means through said spool valve means to provide a fluid path from said inlet to said control chamber, said passage means including orifice means in said projection means;

resilient sleeve means around said projection means, said sleeve being exposed on one side thereof to fluid pressure in said passage means and said sleeve being exposed on the other side thereof to pressure in said control chamber;

bleed means through said resilient sleeve means to provide fluid communication between said passage means and said control chamber means to bleed fluid from said control chamber means to said passage means; and actuator means for actuating said valve means from said first position to said second position.

4. A fluid valve as in claim 3 including:

an annular groove in said projection means, said projection orifice means and said bleed orifice means communicating with said annular groove.

* * * * *